(12) United States Patent
Oguri et al.

(10) Patent No.: US 8,862,342 B2
(45) Date of Patent: Oct. 14, 2014

(54) DRIVING ASSISTANCE DEVICE

(75) Inventors: Haruki Oguri, Susono (JP); Koji Taguchi, Isehara (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 4 days.

(21) Appl. No.: 13/880,871

(22) PCT Filed: Oct. 22, 2010

(86) PCT No.: PCT/JP2010/068727
§ 371 (c)(1),
(2), (4) Date: Apr. 22, 2013

(87) PCT Pub. No.: WO2012/053106
PCT Pub. Date: Apr. 26, 2012

(65) Prior Publication Data
US 2013/0211688 A1    Aug. 15, 2013

(51) Int. Cl.
*G06F 17/00* (2006.01)
*B60W 30/14* (2006.01)
*B60W 30/18* (2012.01)

(52) U.S. Cl.
CPC ............ *G06F 17/00* (2013.01); *B60W 2550/22* (2013.01); *B60W 2540/12* (2013.01); *B60W 2550/402* (2013.01); *B60W 30/143* (2013.01); *B60W 2710/182* (2013.01); *B60W 30/18109* (2013.01); *B60W 2720/106* (2013.01); *B60W 2520/10* (2013.01)
USPC ................................................ 701/50; 701/1

(58) Field of Classification Search
CPC ... B60W 10/184; B60W 10/18; B60T 8/1755; B60T 8/172; B60T 7/22
See application file for complete search history.

(56) References Cited

U.S. PATENT DOCUMENTS

| | | | |
|---|---|---|---|
| 5,580,330 A * | 12/1996 | Minowa et al. | 477/92 |
| 6,202,776 B1 * | 3/2001 | Masberg et al. | 180/65.22 |
| 6,307,277 B1 * | 10/2001 | Tamai et al. | 290/40 C |
| 6,941,216 B2 * | 9/2005 | Isogai et al. | 701/96 |

(Continued)

FOREIGN PATENT DOCUMENTS

| | | |
|---|---|---|
| JP | 2002 373396 | 12/2002 |
| JP | 2005 165423 | 6/2005 |

(Continued)

OTHER PUBLICATIONS

International Search Report Issued Jan. 11, 2011 in PCT/JP10/68727 Filed Oct. 22, 2010.

*Primary Examiner* — Ian Jen
(74) *Attorney, Agent, or Firm* — Oblon, Spivak, McClelland, Maier & Neustadt, L.L.P.

(57) ABSTRACT

An object of the driving assistance device is to provide a driving assistance device capable of preventing the driver from experiencing discomfort. The driving assistance device includes a target deceleration pattern generating unit that generates a target deceleration pattern for deceleration driving and a start position determining unit that determines a deceleration start point where the deceleration driving starts on the basis of the target deceleration pattern. The target deceleration pattern unit generates the target deceleration pattern including a first deceleration pattern in which deceleration in a section from a predetermined position to a target stop position is set and a second deceleration pattern in which deceleration in a section to the predetermined position is set. The deceleration in the first deceleration pattern is more than the deceleration in the second deceleration pattern.

10 Claims, 8 Drawing Sheets

(56) References Cited

U.S. PATENT DOCUMENTS

| | | |
|---|---|---|
| 8,014,925 B2 * | 9/2011 | Saitou et al. .................... 701/55 |
| 2003/0217880 A1 * | 11/2003 | Isogai et al. ................. 180/170 |
| 2005/0128063 A1 | 6/2005 | Isaji et al. |
| 2005/0245351 A1 * | 11/2005 | Yamada et al. ............... 477/110 |
| 2008/0177451 A1 * | 7/2008 | Saitou et al. .................... 701/55 |
| 2008/0284240 A1 * | 11/2008 | Jeong ............................. 303/11 |
| 2009/0069964 A1 * | 3/2009 | Wyatt et al. .................... 701/22 |
| 2009/0314559 A1 * | 12/2009 | Palitto ....................... 180/65.22 |
| 2010/0252343 A1 * | 10/2010 | Hilberer .................... 180/65.25 |
| 2010/0305838 A1 * | 12/2010 | Yamamura et al. ........... 701/113 |
| 2011/0066350 A1 * | 3/2011 | Sonoda et al. .................. 701/96 |
| 2013/0211688 A1 * | 8/2013 | Oguri et al. .................... 701/70 |

FOREIGN PATENT DOCUMENTS

| | | |
|---|---|---|
| JP | 2006 139707 | 6/2006 |
| JP | 2008 74337 | 4/2008 |
| JP | 2009 244167 | 10/2009 |

* cited by examiner

DRIVING ASSISTANCE DEVICE

TECHNICAL FIELD

The present invention relates to a driving assistance device that assists vehicle deceleration driving.

BACKGROUND ART

As a driving assistance device according to the related art, a device has been known which combines deceleration during non-regeneration and non-acceleration traveling and deceleration when a vehicle travels while a regenerative brake is operated, generates a deceleration pattern from the present point to a target stop position, and assists vehicle deceleration driving on the basis of the deceleration pattern, thereby reducing fuel consumption (for example, see Patent Literature 1).

CITATION LIST

Patent Literature

[Patent Literature 1] Japanese Unexamined Patent Application Publication No. 2008-74337

SUMMARY OF INVENTION

Technical Problem

However, in the driving assistance device, the deceleration pattern before stopping is greatly changed depending on the distance from the present point to the target stop position. Therefore, in some cases, the driver experiences discomfort.

An object of the invention is to provide a driving assistance device capable of preventing the driver from experiencing discomfort.

Solution to Problem

According to an aspect of the invention, a driving assistance device that assists vehicle deceleration driving includes: target deceleration pattern generating means for generating a target deceleration pattern for the deceleration driving; and start position determining means for determining a deceleration start point where the deceleration driving starts on the basis of the target deceleration pattern. The target deceleration pattern generating means generates the target deceleration pattern including a first deceleration pattern in which deceleration in a section from a predetermined position to a target stop position is set and a second deceleration pattern in which deceleration in a section to the predetermined position is set. The deceleration in the first deceleration pattern is more than the deceleration in the second deceleration pattern.

In the driving assistance device, the target deceleration pattern is generated which includes the first deceleration pattern in which deceleration in the section from the predetermined position to the target stop position is set and the second deceleration pattern in which deceleration in the section to the predetermined position is set and in which the deceleration in the first deceleration pattern is more than that in the second deceleration pattern. Then, the deceleration start point is determined on the basis of the target deceleration pattern. That is, in the driving assistance device according to the invention, the deceleration section in the first deceleration pattern is constant, regardless of the distance from the present point to the target stop position, and the deceleration start point is determined on the basis of the deceleration pattern. Therefore, deceleration driving assistance is performed such that the deceleration pattern before stop is stabilized and it is possible to prevent the driver from experiencing discomfort.

The deceleration in the first deceleration pattern may be deceleration when a brake of the vehicle is operated, and the deceleration in the second deceleration pattern may be deceleration when an accelerator of the vehicle is released. In this case, driving assistance suitable for general deceleration driving in which, after the accelerator is released for deceleration, the brake is operated to increase deceleration, thereby stopping the vehicle, is performed. Therefore, it is possible to prevent the driver from experiencing discomfort.

The start position determining means may determine the deceleration start point on the basis of the target deceleration pattern and a speed of the vehicle. In this case, as the speed of the vehicle increases, a deceleration distance increases. Therefore, it is possible to reduce fuel consumption.

The driving assistance device according to the above-mentioned aspect may further include signal information acquiring means for acquiring information about a traffic signal on a road on which the vehicle travels. The target deceleration pattern generating means may change the predetermined position on the basis of the information about the traffic signal corresponding to the target stop position. In this case, it is possible to increase the length of the deceleration section in the first deceleration pattern in a situation in which it takes a long time until the traffic signal corresponding to the target stop position shows a stop signal (red). Since the deceleration in the first deceleration pattern is more than that in the second deceleration pattern, the deceleration period is reduced as the length of the deceleration section in the first deceleration pattern increases. Therefore, the deceleration period when the traffic signal does not show the stop signal is short and it is possible to prevent the driver from experiencing such discomfort that the driver stops at the traffic signal where the driver does not need to stop.

The driving assistance device according to the above-mentioned aspect may further include driving force control means for controlling driving force of the vehicle. The target deceleration pattern generating means may change the predetermined position on the basis of the number of times the driving force control is cancelled. In this case, the taste of the driver is estimated on the basis of the number of times the driving force control is cancelled and the predetermined position is changed depending on the taste of the driver. Therefore, it is possible to prevent the driver from experiencing discomfort.

Advantageous Effects of Invention

According to the driving assistance device of the invention, it is possible to prevent the driver from experiencing discomfort.

DESCRIPTION OF EMBODIMENTS

Hereinafter, driving assistance devices according to exemplary embodiments of the invention will be described in detail with reference to the accompanying drawings. In the drawings, the same or similar components are denoted by the same reference numerals and the description thereof will not be repeated.

Figure 1:
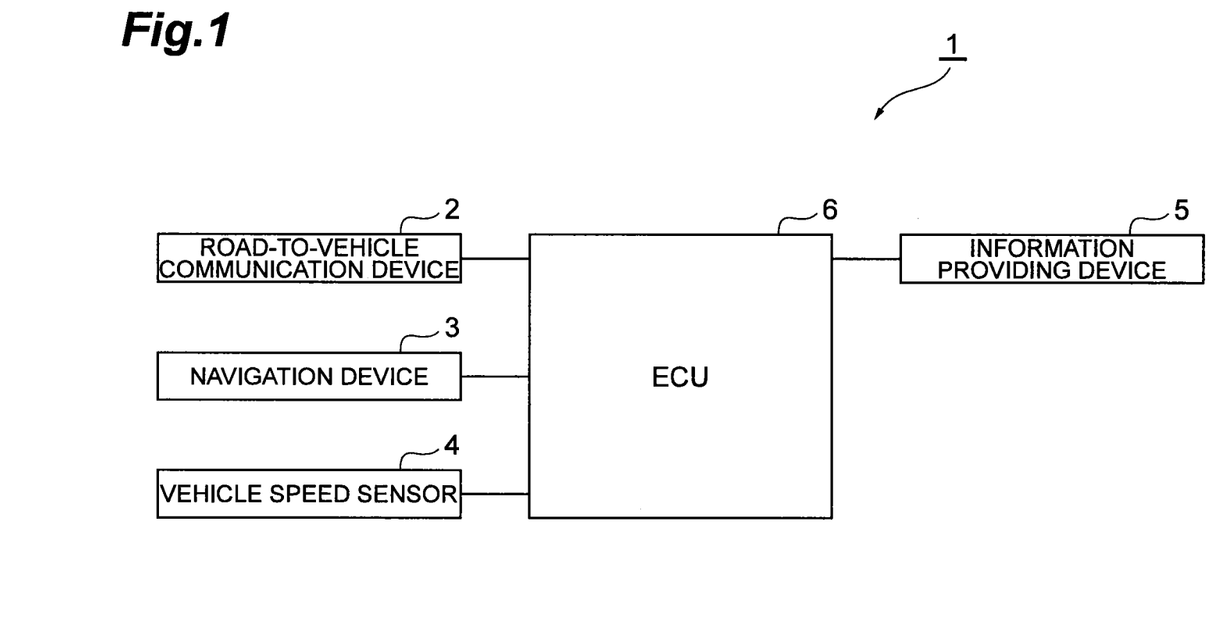
FIG. 1 is a diagram illustrating the schematic structure of a driving assistance device according to a first embodiment.

FIG. 1 is a diagram illustrating the schematic structure of a driving assistance device according to a first embodiment of the invention. As shown in FIG. 1, a driving assistance device 1 includes a road-to-vehicle communication device 2, a navigation device 3, a vehicle speed sensor 4, an information providing device 5, and an ECU (Electronic Control Unit) 6.

The road-to-vehicle communication device 2 communicates with an optical beacon or a broadcast medium installed on the road and acquires information (for example, road alignment information or signal information) about the road or traffic signals around the host vehicle. In this embodiment, the road-to-vehicle communication device 2 is used as signal information acquiring means for acquiring information about the traffic signal (in this embodiment, the time for changing of the traffic signal) on the road on which the host vehicle travels.

The navigation device 3 acquires information about the current position of the host vehicle and the road using, for example, a GPS. The navigation device 3 stores map data and compares the map data with the current position of the host vehicle to specify the road on which the host vehicle is traveling. In addition, the navigation device 3 stores traffic rule data including a temporary stop position and compares the traffic rule data with the route through which the host vehicle will travel to specify the position where the host vehicle needs to be stopped according to the traffic rules.

The vehicle speed sensor 4 detects the speed of the host vehicle. The information providing device 5 is notification means for instructing the driver to start deceleration driving (in this embodiment, to release the accelerator).

The ECU 6 is a computer which is connected to the road-to-vehicle communication device 2, the navigation device 3, the vehicle speed sensor 4, and the information providing device 5. The ECU 6 performs a deceleration driving assistance process according to the procedure shown in FIG. 2. First, stop position candidates for the target stop position of the host vehicle are extracted on the basis of the information obtained by the navigation device 3 (Step S1). When the stop position candidates are extracted, the time for changing of the traffic signals at the stop position candidates is acquired by the road-to-vehicle communication device 2 (Step S2).

Figure 2:
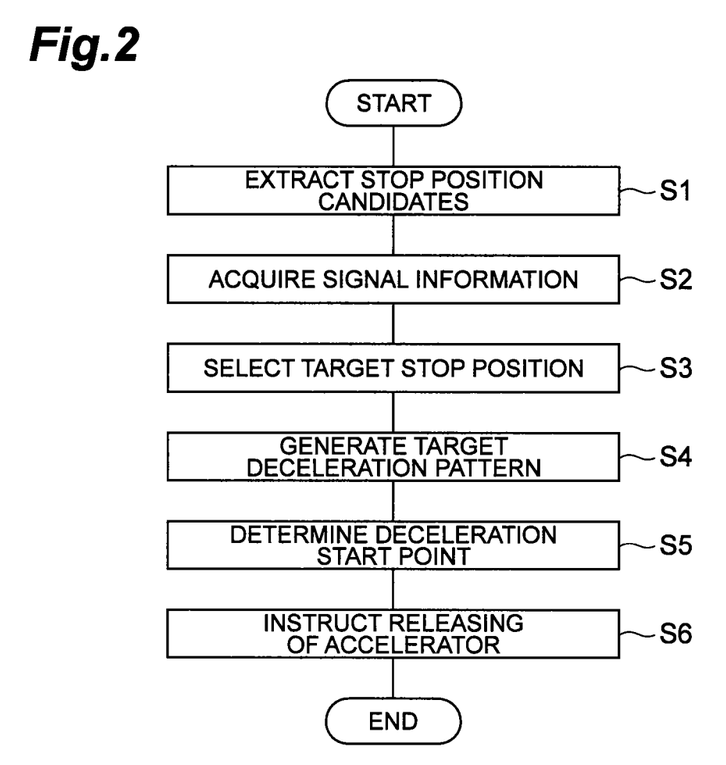
FIG. 2 is a flowchart illustrating a driving assistance process performed by an ECU according to the first embodiment.

Then, the target stop position is selected from the stop position candidates (Step S3). For example, the position where the traffic signal shows a stop signal (red) before the host vehicle passes through is selected as a first candidate position. When there is no stop position where the vehicle needs to stop according to the traffic rules between the host vehicle and the first candidate position, the first candidate position is selected as the target stop position. When there is a stop position where the vehicle needs to stop according to the traffic rules between the host vehicle and the first candidate position, the stop position is selected as the target stop position. When the target stop position is selected, a target deceleration pattern is generated (Step S4) and a deceleration start point is determined (Step S5). As such, the ECU 6 functions as target deceleration pattern generating means for generating the target deceleration pattern for deceleration driving and start position determining means for determining the deceleration start point.

Figure 3:
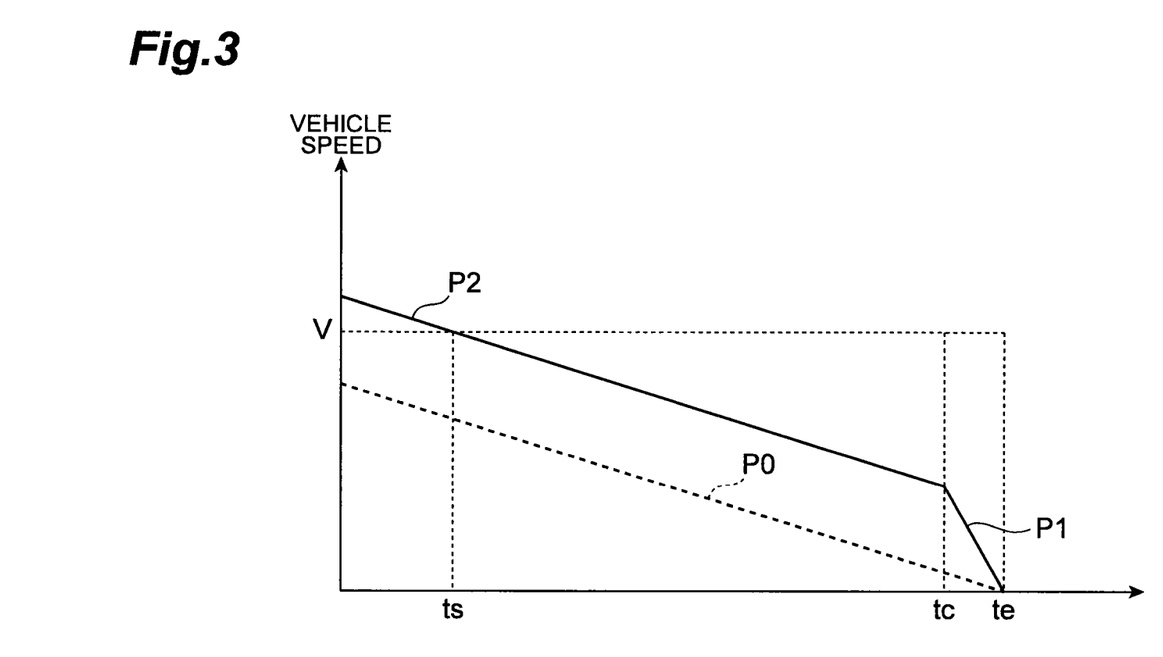
FIG. 3 is a schematic diagram illustrating a target deceleration pattern generated by the flowchart shown in FIG. 2.

An example of the target deceleration pattern and the deceleration start point will be described with reference to FIG. 3. FIG. 3 is a diagram illustrating the target deceleration pattern indicating a change in the vehicle speed over time. The target deceleration pattern shown in FIG. 3 includes a first deceleration pattern P1 in which deceleration in a section from a predetermined position to the target stop position is set and a second deceleration pattern P2 in which deceleration in a section to the predetermined position is set. In FIG. 3, a stop time te corresponds to the target stop position and a time tc corresponds to the predetermined position. A vehicle speed change in the first deceleration pattern P1 is more than that in the second deceleration pattern P2. That is, deceleration in the first deceleration pattern P1 is more than that in the second deceleration pattern P2. In this embodiment, the deceleration in the first deceleration pattern P1 is set as the deceleration when the brake of the host vehicle is operated and the deceleration in the second deceleration pattern P2 is set as the deceleration when the accelerator of the host vehicle is released. As such, the predetermined position is a deceleration change position and is set in correspondence with the time when the driver starts the brake operation.

The deceleration when the brake of the host vehicle is operated varies depending on conditions such as the strength of the brake operation. The ECU 6 may store information about the strength of the brake operation, such as deceleration when the brake operation is performed, and determine the deceleration in the first deceleration pattern P1 with reference to the stored information.

The time when the driver starts the brake operation varies depending on the taste of the driver. The ECU 6 may store information about the start time of the brake operation, such as the distance traveled during the period from the start to the end of the brake operation, and determine the predetermined position (deceleration change position) with reference to the stored information.

The deceleration start point is determined on the basis of the target deceleration pattern and the speed of the host vehicle (in this embodiment, a vehicle speed at the present time). Specifically, the time ts when the vehicle speed on the target deceleration pattern is equal to a vehicle speed V at the present time is calculated and the deceleration start point is determined so as to correspond to the time ts.

When the host vehicle reaches the deceleration start point, as shown in FIG. 2, an instruction to release the accelerator is issued through the information providing device 5 (Step S6). When the driver follows the instruction, the host vehicle is decelerated according to the target deceleration pattern. Since the target deceleration pattern includes the first deceleration pattern P1 of the deceleration when the brake operation is performed, the driver operates the brake in order to stop the vehicle at the target stop position. When the host vehicle reaches the predetermined position (deceleration change position), the ECU 6 may instruct the start of the brake operation through the information providing device 5. In addition, the ECU 6 may instruct the releasing of the accelerator before the vehicle reaches the deceleration start point. The ECU 6 may instruct the start of the brake operation before the vehicle reaches the predetermined position.

In the driving assistance device 1 having the above-mentioned structure, the target deceleration pattern is generated which includes the first deceleration pattern P1 in which deceleration in the section from the predetermined position (deceleration change position) to the target stop position is set and the second deceleration pattern P2 in which deceleration in the section to the predetermined position is set and in which the deceleration in the first deceleration pattern P1 is more than that in the second deceleration pattern P2. Then, the deceleration start point is determined on the basis of the target deceleration pattern. That is, in the driving assistance device 1, a deceleration section is constant in the first deceleration pattern P1, regardless of the distance from the present point to the target stop position, and the deceleration start point is determined on the basis of the deceleration pattern. Therefore, deceleration driving assistance is performed such that the deceleration pattern before stop is stabilized and it is possible to prevent the driver from experiencing discomfort.

When the deceleration section is not constant in the first deceleration pattern P1, for example, a target deceleration pattern without the first deceleration pattern P1 may be generated (see a deceleration pattern P0 in FIG. 3). When driving assistance is performed on the basis of such target deceleration pattern, the time for which the vehicle travels at a low speed before stop increases and the driver experiences discomfort.

The deceleration in the first deceleration pattern P1 is deceleration when the brake of the vehicle is operated and the deceleration in the second deceleration pattern P2 is deceleration when the accelerator of the vehicle is released. Therefore, driving assistance suitable for general deceleration driving in which, after the accelerator is released for deceleration, the brake is operated to increase deceleration, thereby stopping the vehicle, is performed.

Since the deceleration start point is determined on the basis of the relationship between the target deceleration pattern and the speed of the host vehicle, a deceleration distance increases as the speed of the host vehicle increases. As a result, fuel consumption is reduced.

In the deceleration driving assistance according to this embodiment, the driver is instructed to release the accelerator at the deceleration start point. As such, since the releasing of the accelerator is instructed, the actual deceleration pattern is close to the target deceleration pattern and the balance between the deceleration distance only by the releasing of the accelerator and the deceleration distance by the brake operation is appropriately maintained. Therefore, deceleration driving is achieved without giving discomfort to the driver. In addition, since the deceleration distance only by the releasing of the accelerator is maintained, the distance traveled during deceleration driving increases and fuel-efficient driving is achieved. In addition, since the driver performs deceleration driving, deceleration driving assistance is achieved without damaging the fulfillment of the driver.

Next, a driving assistance device according to a second embodiment of the invention will be described. A driving assistance device 1 according to the second embodiment differs from the driving assistance device 1 according to the first embodiment in that the predetermined position (deceleration change position) is changed on the basis of information about the traffic signal corresponding to the target stop position. The structure of the second embodiment is the same as that of the first embodiment and the description thereof will not be repeated.

Figure 4:
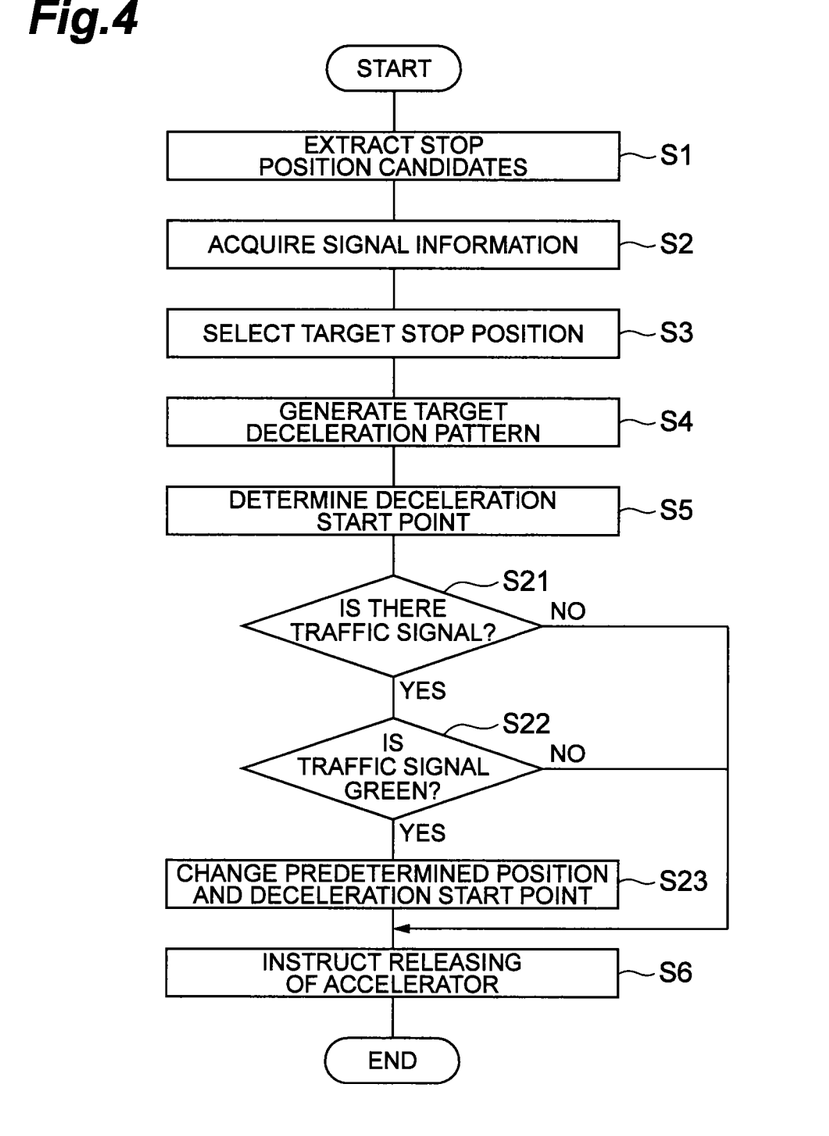
FIG. 4 is a flowchart illustrating a driving assistance process performed by an ECU according to a second embodiment.

The procedure of a deceleration driving assistance process performed by an ECU 6 according to the second embodiment will be described with reference to FIG. 4. In the second embodiment, the ECU 6 determines the deceleration start point in the same Steps S1 to S5 as those in the process of the ECU 6 according to the first embodiment and changes the predetermined position (deceleration change position) and the deceleration start point. When the deceleration start point is determined in Step S5, it is determined whether there is a traffic signal at the target stop position (Step S21). When there is no traffic signal, the process proceeds to Step S6 and the releasing of the accelerator is instructed. When there is a traffic signal, it is determined whether the traffic signal is green at the time when the host vehicle reaches the deceleration start point (Step S22). When the traffic signal is not green at the deceleration start point, the process proceeds to Step S6. When the traffic signal is green at the deceleration start point, the predetermined position and the deceleration start point are changed (Step S23).

Figure 5:
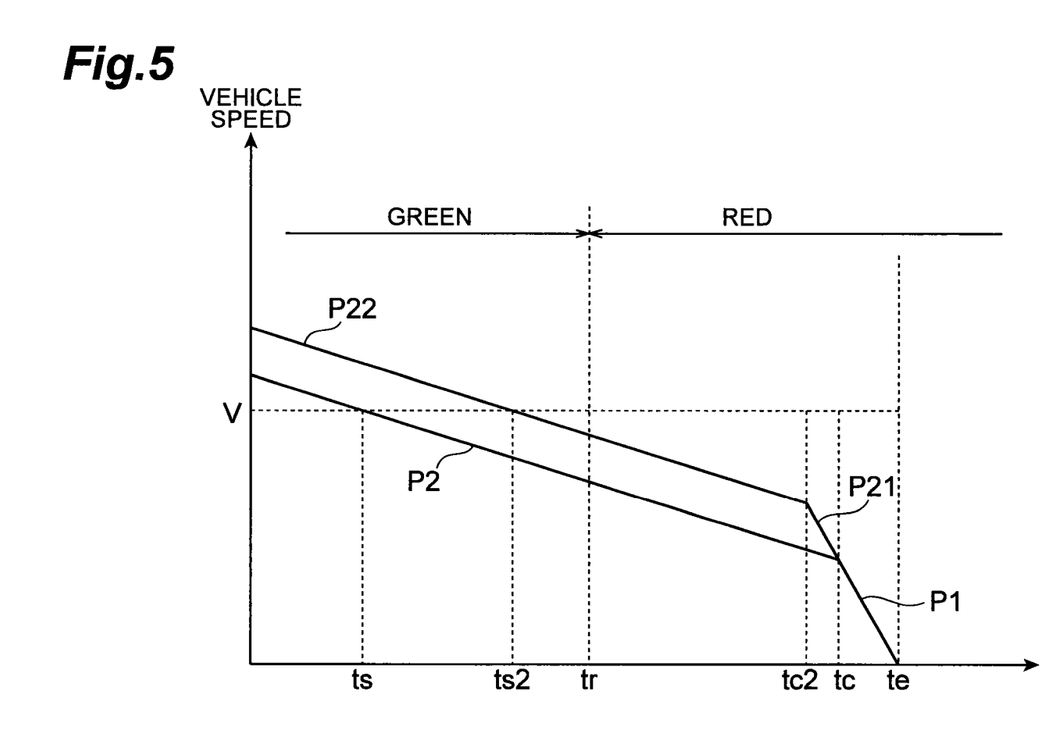
FIG. 5 is a schematic diagram illustrating a target deceleration pattern generated by the flowchart shown in FIG. 4.

An example of a process of changing a target deceleration pattern and the deceleration start point will be described with reference to FIG. 5. First, similarly to the first embodiment, a target deceleration pattern including a first deceleration pattern P1 and a second deceleration pattern P2 is generated and the deceleration start point corresponding to a time ts is determined. The time tr when the traffic signal at the target stop position changes from green to red is after the time ts and it is determined that the traffic signal is green at the acceleration start point. In this case, a time tc corresponding to the predetermined position (deceleration change position) changes to a time tc2 earlier than the time tc. That is, the predetermined position is away from the target stop position. Then, a target pattern is changed on the basis of the changed predetermined position. The changed target pattern includes a first deceleration pattern P21 in which deceleration in a section from the changed predetermined position to the target stop position is set and a second deceleration pattern P22 in which deceleration in a section to the changed predetermined position is set. The deceleration in the first deceleration pattern P21 is equal to that in the first deceleration pattern P1. The deceleration in the second deceleration pattern P22 is equal to that in the second deceleration pattern P2.

The deceleration start point is changed to a point corresponding to the time ts2 when the vehicle speed on the changed target deceleration pattern is equal to a vehicle speed V at the present time. The time ts2 is closer to a stop time te than the time ts. That is, a deceleration period to the target stop position is shorter than that before the predetermined position (deceleration change position) is changed and the deceleration period while the traffic signal does not show a stop signal (while the traffic signal is green in this embodiment) is short.

In this way, in this embodiment, it is possible to prevent the driver from experiencing such discomfort that the driver stops at the traffic signal where the driver does not need to stop.

In this embodiment, when the traffic signal at the deceleration start point does not show a stop signal, the predetermined position (deceleration change position) is changed. However, the invention is not limited thereto. For example, when the period from the start of deceleration to a change in the signal of the traffic signal (from the time ts to the time tr) is longer than a predetermined period, the predetermined position may be changed.

Next, a driving assistance device according to a third embodiment of the invention will be described. A driving assistance device 31 according to the third embodiment differs from the driving assistance device 1 according to the first embodiment in that it further includes a driving force control device, driving force control is performed instead of the instruction to release the accelerator, and the predetermined position (deceleration change position) is changed according to the number of times the driving force control is cancelled.

Figure 6:
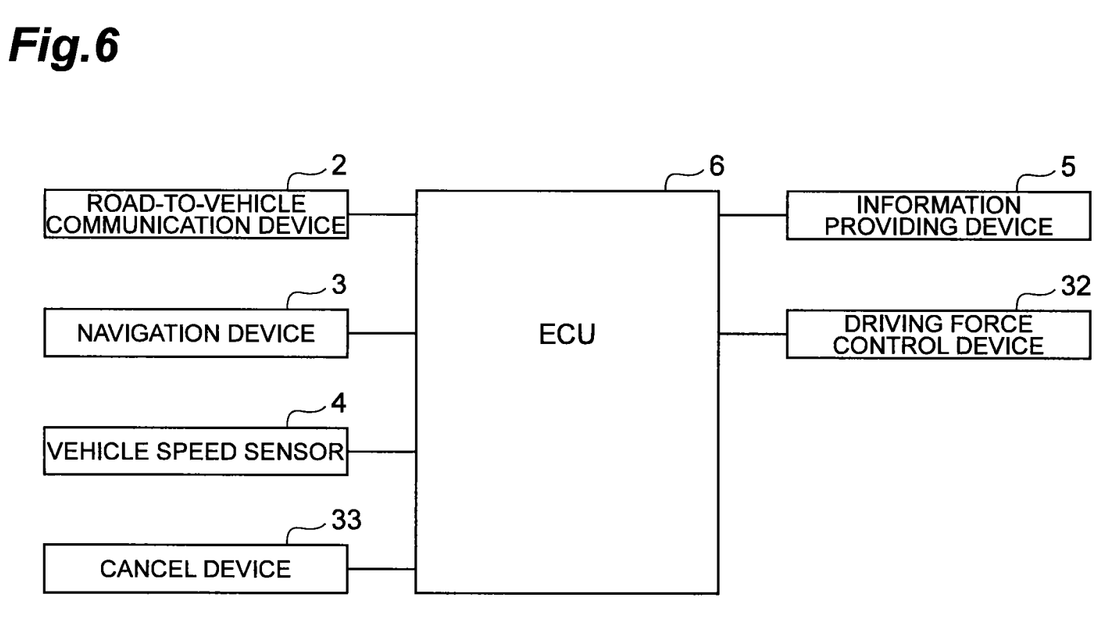
FIG. 6 is a diagram illustrating the schematic structure of a driving assistance device according to a third embodiment.

FIG. 6 is a diagram illustrating the schematic structure of the driving assistance device according to the third embodiment of the invention. As shown in FIG. 6, a driving assistance device 31 according to the third embodiment includes a road-to-vehicle communication device 2, a navigation device 3, a vehicle speed sensor 4, an information providing device 5, and an ECU (Electronic Control Unit) 6, similarly to the driving assistance device 1 according to the first embodiment. The driving assistance device 31 further includes a driving force control device 32, which is driving force control means, and a cancel device 33.

The driving force control device 32 intervenes the accelerator operation of the driver and controls the driving force of a power source of the host vehicle. The cancel device 33 is used by the driver to input an instruction to cancel the driving force control of the driving force control device 32. The driving force control device 32 and the cancel device 33 are connected to the ECU 6.

The procedure of a deceleration driving assistance process performed by the ECU 6 according to the third embodiment will be described with reference to FIG. 7. First, the target deceleration pattern is generated by the same Steps S1 to S5 as those in the process of the ECU 6 according to the first embodiment and the deceleration start point is determined. Then, in a predetermined number of deceleration driving assistance operations which have been previously performed, the number of times a cancel instruction is input to the cancel device 33, that is, the number of times the driving force control of the driving force control device 32 is cancelled is read (Step S31). When the number of times the driving force control is cancelled is read, the target deceleration pattern and the deceleration start point are changed according to the number of cancel operations (Step S32).

Figure 8:
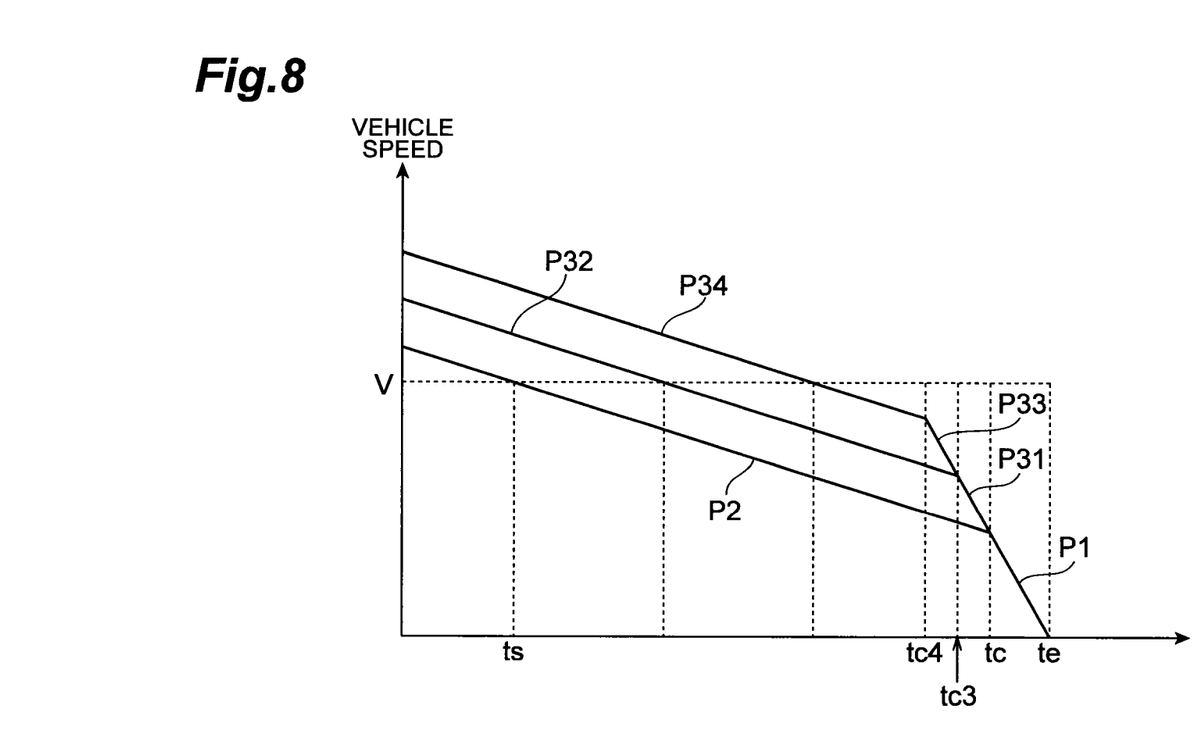
FIG. 8 is a schematic diagram illustrating a target deceleration pattern generated by the flowchart shown in FIG. 7.

An example of a process of changing the target deceleration pattern and the deceleration start point will be described with reference to FIG. 8. First, the number of cancel operations read in Step S31 is classified into three classes "large", "medium", and "small". When the number of cancel operations is "small", the target deceleration pattern and the deceleration start point are not changed.

When the number of cancel operations is "large", it is determined that the driver experiences great discomfort and the predetermined position (deceleration change position) is changed. Here, it is determined that the driver experiences discomfort that a deceleration section by a brake operation is short and the time tc corresponding to the predetermined position is changed to a time tc4 that is earlier than the time tc. That is, the predetermined position is away from the target stop position. Then, a target pattern is changed on the basis of the changed predetermined position. The changed target pattern includes a first deceleration pattern P33 in which deceleration in a section from the changed predetermined position to the target stop position is set and a second deceleration pattern P34 in which deceleration in a section to the changed predetermined position is set. The deceleration in the first deceleration pattern P33 is equal to that in the first deceleration pattern P1. The deceleration in the second deceleration pattern P34 is equal to that in the second deceleration pattern P2.

When the number of cancel operations is "medium", the time tc is changed to a time tc3 between the time tc and the time tc4. Then, a target deceleration pattern is changed according to the changed predetermined position (deceleration change position), similarly to when the number of cancel operations is "large". The changed target deceleration pattern includes a first deceleration pattern P31 and a second deceleration pattern P32.

When the target deceleration pattern and the deceleration start point are changed, the number of cancel operations returns to 0.

Figure 7:
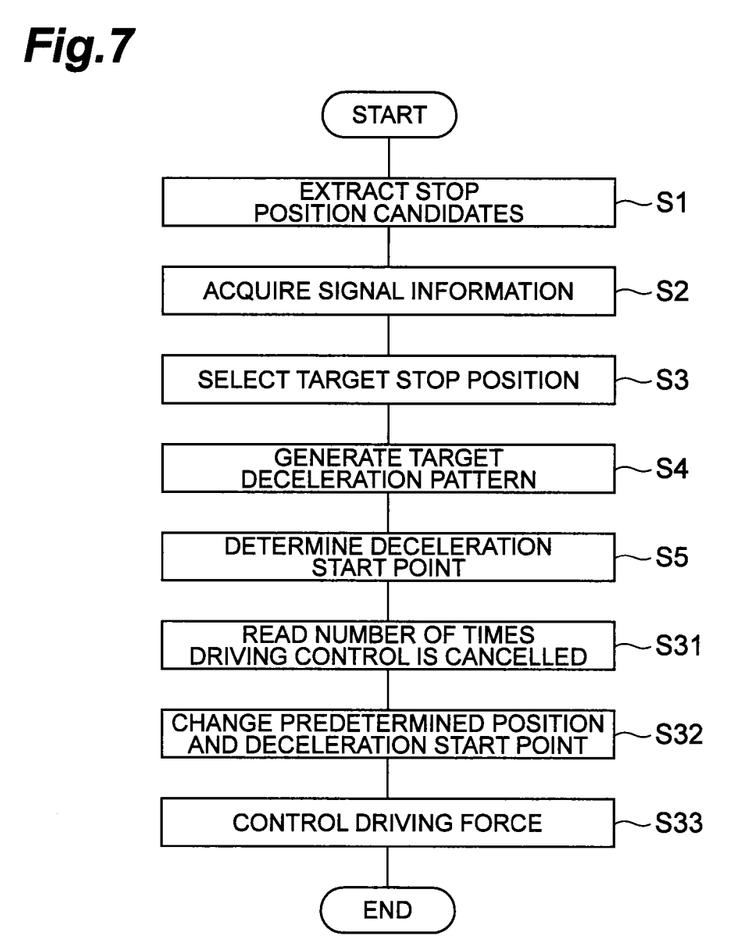
FIG. 7 is a flowchart illustrating a driving assistance process performed by an ECU according to the third embodiment of the invention.

When the process of changing the target deceleration pattern and the deceleration start point is completed, driving force control is performed, as shown in FIG. 7 (Step S33). Here, the driving force control device intervenes in the accelerator operation of the driver and performs control such that the driving force of the power source of the host vehicle is driving force in a releasing state of the accelerator.

In this way, in this embodiment, the taste of the driver is estimated on the basis of the number of times the driving force control is cancelled and the predetermined position (deceleration change position) is changed depending on the taste of the driver. Therefore, it is possible to prevent the driver from experiencing discomfort.

Industrial Applicability

According to the invention, it is possible to provide a driving assistance device capable of preventing the driver from experiencing discomfort.

Reference Signs List 1, 31: DRIVING ASSISTANCE DEVICE
2: ROAD-TO-VEHICLE COMMUNICATION DEVICE
3: NAVIGATION DEVICE
4: VEHICLE SPEED SENSOR
5: INFORMATION PROVIDING DEVICE
6: ECU
32: DRIVING FORCE CONTROL DEVICE
33: CANCEL DEVICE
P1, P21, P31, P33: FIRST DECELERATION PATTERN
P2, P22, P32, P34: SECOND DECELERATION PATTERN

The invention claimed is:

1. A driving assistance device that assists vehicle deceleration driving, comprising:
a target deceleration pattern generating unit configured to generate a target deceleration pattern for the deceleration driving;
a start position determining unit configured to determine a deceleration start point where the deceleration driving starts on the basis of the target deceleration pattern; and
a storage unit configured to store information about a deceleration operation of a driver,
wherein the target deceleration pattern generating unit generates the target deceleration pattern including a first deceleration pattern in which deceleration in a section from a predetermined position, which is set on the basis of a time when the driver starts the deceleration operation, to a target stop position is set and a second deceleration pattern in which deceleration in a section to the predetermined position is set, and
the deceleration in the first deceleration pattern is more than the deceleration in the second deceleration pattern.

2. The driving assistance device according to claim 1, wherein the deceleration in the first deceleration pattern is deceleration when a brake of the vehicle is operated, and the deceleration in the second deceleration pattern is deceleration when an accelerator of the vehicle is released.

3. The driving assistance device according to claim 1, wherein the start position determining unit determines the deceleration start point on the basis of the target deceleration pattern and a speed of the vehicle.

4. The driving assistance device according to claim 1, further comprising:
a signal information acquiring unit configured to acquire information about a traffic signal on a road on which the vehicle travels,
wherein the target deceleration pattern generating unit changes the predetermined position on the basis of the information about the traffic signal corresponding to the target stop position.

5. The driving assistance device according to claim 1, further comprising:
a driving force control unit configured to control driving force of the vehicle,
wherein the target deceleration pattern generating unit changes the predetermined position on the basis of the number of times the driving force control is cancelled.

6. The driving assistance device according to claim 1, further comprising:
a signal information acquiring unit configured to acquire information about a time for changing of a traffic signal on a road on which the vehicle travels,
wherein the target deceleration pattern generating unit generates the target deceleration pattern, using a position corresponding to the traffic signal which changes to a stop signal before the vehicle passes through as the target stop position, on the basis of the information about the time for changing of the traffic signal.

7. The driving assistance device according to claim 6,
wherein, after generating the target deceleration pattern, the target deceleration pattern generating unit changes the predetermined position on the basis of the information about the time for changing of the traffic signal corresponding to the target stop position, and changes the target deceleration pattern on the basis of the changed predetermined position, and
the start position determining unit changes the deceleration start point on the basis of the changed target deceleration pattern.

8. The driving assistance device according to claim 7,
wherein the target deceleration pattern generating unit changes the predetermined position so as to be away from the target stop position when it is determined that the traffic signal corresponding to the target stop position is green at a time when the vehicle reaches the deceleration start point, on the basis of the information about the time for changing of the traffic signal corresponding to the target stop position.

9. A driving assistance device that assists vehicle deceleration driving, comprising:
a target deceleration pattern generating unit configured to generate a target deceleration pattern for the deceleration driving;
a signal information acquiring unit configured to acquire the information about a time for changing of a traffic signal on a road on which the vehicle travels; and
a start position determining unit configured to determine a deceleration start point where the deceleration driving starts on the basis of the target deceleration pattern,
wherein the target deceleration pattern generating unit selects a position corresponding to the traffic signal which changes to a stop signal before the vehicle passes through as a target stop position, on the basis of the information about the time for changing of the traffic signal,
the target deceleration pattern generating unit generates the target deceleration pattern including a first deceleration pattern in which deceleration in a section from a predetermined position to the target stop position is set and a second deceleration pattern in which deceleration in a section to the predetermined position is set to be more than the deceleration in the first deceleration pattern,
the target deceleration pattern generating unit changes the predetermined position so as to be away from the target stop position when it is determined that the traffic signal corresponding to the target stop position is green at a time when the vehicle reaches the deceleration start point, on the basis of the information about the time for changing of the traffic signal corresponding to the target stop position, and changes the target deceleration pattern on the basis of the changed predetermined position, and
the start position determining unit changes the deceleration start point on the basis of the changed target deceleration pattern.

10. A driving assistance device that assists vehicle deceleration driving, comprising:
a target deceleration pattern generating unit configured to generate a target deceleration pattern for the deceleration driving;
a start position determining unit configured to determine a deceleration start point where the deceleration driving starts on the basis of the target deceleration pattern; and
a driving force control unit configured to control driving force of the vehicle,
wherein the target deceleration pattern generating unit generates the target deceleration pattern including a first deceleration pattern in which deceleration in a section from a predetermined position to a target stop position is set and a second deceleration pattern in which deceleration in a section to the predetermined position is set to be more than the deceleration in the first deceleration pattern, and changes the predetermined position on the basis of the number of times the driving force control is cancelled.

* * * * *